United States Patent [19]

Sakaegi

[11] Patent Number: 5,239,426
[45] Date of Patent: Aug. 24, 1993

[54] RECORDING OR REPRODUCING APPARATUS ADAPTED TO INTERMITTENTLY DETECT AND MEMORIZE LOADING OR EJECTING OF A RECORDING MEDIUM

[75] Inventor: Yuji Sakaegi, Kanagawa, Japan
[73] Assignee: Canon Kabushiki Kaisha, Tokyo, Japan
[21] Appl. No.: 883,918
[22] Filed: May 12, 1992

Related U.S. Application Data

[63] Continuation of Ser. No. 441,948, Nov. 27, 1989, abandoned.

[30] Foreign Application Priority Data

Dec. 3, 1988 [JP] Japan .................................. 63-306710

[51] Int. Cl.$^5$ .................................................. G11B 3/90
[52] U.S. Cl. .......................................... 360/69; 360/71; 369/58; 369/233; 358/909
[58] Field of Search ..................... 360/69, 71; 369/58, 369/233; 358/906, 909

[56] References Cited

U.S. PATENT DOCUMENTS

4,951,276 8/1990 Sakaegi et al. ........................ 369/58
5,005,088 4/1991 Fukushima et al. ................... 360/69

Primary Examiner—Joseph L. Dixon
Assistant Examiner—David L. Robertson
Attorney, Agent, or Firm—Robin, Blecker, Daley & Driscoll

[57] ABSTRACT

A recording or reproducing apparatus capable of replacing a recording medium is provided with a switch operable in connection with the loading or ejection of the recording medium, a circuit for intermittently detecting the state of the switch, a memory circuit for storing the output of the detecting circuit, a device for initializing the recording medium, and a control circuit for controlling the operation of the initializing device in accordance with the stored content of the memory circuit when electric power is supplied to the recording or reproducing apparatus.

22 Claims, 5 Drawing Sheets

RECORDING OR REPRODUCING APPARATUS ADAPTED TO INTERMITTENTLY DETECT AND MEMORIZE LOADING OR EJECTING OF A RECORDING MEDIUM

This is a continuation application under 37 CFR 1.62 of prior application Ser. No. 441,948, filed Nov. 27, 1989, now abandoned.

BACKGROUND OF THE INVENTION

1. Field of the Invention

This invention relates to recording or reproducing apparatuses and, more particularly, to a recording medium replacement detecting device for detecting the fact that the recording medium has been replaced.

2. Description of the Related Art

The apparatus for recording pictures, sound and other items of information on a recording medium has been proposed in many forms. Yet, recently, electronic cameras are rapidly spreading, which use, for example, what is called a "video floppy disk" as the recording medium. When the video signals or audio signals are recorded, a plurality tracks are formed successively on it. After recorded, the picture or sound can be reproduced, printed out, or transmitted through the telephone line.

Since a number of items of information are recorded successively in the corresponding number of tracks on the recording medium, for such an electronic camera, it becomes a very important prerequisite that the available recording tracks on the recording medium are effectively used, while avoiding occurrence of double recording on one and the same track. In other words, there is need to do always a task that, prior to executing a recording, the recording head is accurately positioned to the unrecorded area on the recording medium.

A double recording preventing mechanism of this kind is known by employing a method that, prior to making the recording, whether or not the position to be recorded on the recording medium is fresh is examined, and, if, as the recorded information already exists in this position, this position is determined to have been used for recording, the recording head is moved to the next area. Such a procedure is repeated. Thus, the recording head finally reaches the unrecorded area. (An example of this mechanism is disclosed in U.S. Pat. No. 4,783,707.)

In the recording or reproducing apparatus of the character described above, by adopting the control sequence of, for example, a scheme that the termination of the recording in one recording area, or the actuation for the initiation of the next recording operation, is followed by the movement of the recording head to the next recording position, the present position itself of the head on the recording medium becomes equivalent to the memorizing of the next recording position for the recording medium. Therefore, even with the electric power source being turned off, or, in a case where the apparatus is of the type which can be driven by the dry battery, even with the battery being taken out for the replacement purpose by a new one, or for the recharging purpose, or further, as the actual voltage of the electric power source has fallen below the predetermined threshold level, even with battery having become unusable, when the electric power source is turned on again, or recovered, it results that for that recording medium which was used in the preceding recording, even if a recording is started from the present position of the head, no double recording takes place, provided the recording head is not moved and it also does not happen that an unnecessarily unrecorded area or vacant track is formed.

However, according to this arrangement, if the recording medium is replaced during the time when the electric power source is cut off in any way whatever, the present position of the recording head totally loses its significance. The ignorance of this in proceeding the recording, therefore, will result in either a double recording, or formation of vacant tracks, or like problems.

To cope with such situations, the locating operation of the recording head to the unrecorded area on the recording medium must be carried out, as has been described before, each time the electric power source is turned on. This implies that despite no replacement of the recording medium, every time the electric power source is turned on, it happens that the sequence of operations of detecting the unrecorded area and of locating the recording head is recycled. Hence, the real time recordation (the snap shot in terms of camera) is largely damaged. In the battery-driven apparatus, there is another drawback of premature consumption of electric energy in the battery.

In another type of apparatus, too, which, depending on the characteristic and type of the used recording medium, exchanges the recording heads and determines the values of various factors for recording, similar problems to those described above arise.

To solve such problems, a method has been proposed by using a mechanism for mechanically memorizing the replacement of the recording medium and by carrying out the re-location of the recording head according to the state of that memory mechanism (in U.S. Pat. No. 5,072,317 filed on Feb. 5, 1986).

Also, with the fact in mind that the lid of the chamber for the recording medium in the apparatus opens and closes when the recording medium is replaced, another method has been proposed in U.S. Pat. No. 4,951,276 filed on Dec. 2, 1987 where use is made of a switch as arranged to turn on at a time during the opening operation of the lid, whereby the replacement of the recording medium is detected.

However, the use of the above-described mechanical form of the means for memorizing the replacement of the recording medium in the recording medium replacement detecting device leads to an increase in the necessary number of parts. This is not only disadvantageous at the aspect of production cost, but also, because an additional mechanism for resetting the device from the mechanical memory becomes necessary, the mechanical feature gets even more complicated. Furthermore, there is even a drawback that it takes a relatively long time to carry out the resetting operation.

The switch type of replacement detecting device for the recording medium also has many problems, since, in addition to the switch for detecting when the lid is opened, there is need to use another switch which detects that the recording medium has been inserted into and seated in the chamber, yet another switch which detects that the lid is being closed, and a furthermore switch which senses the write-protect notch. This is disadvantageous on space. Further, because the switch for detecting the opened lid is associated with the complicated mechanism as has been described before, this contributes to a cause of increasing the cost.

SUMMARY OF THE INVENTION

The present invention has been made to eliminate the above-described problems and its first object is to provide a recording or reproducing apparatus which enables the replacement of the recording medium to be detected for memorization reliably as it is done electrically.

A second object of the invention is to provide a recording or reproducing apparatus in which the detection of the replacement of the recording medium can be performed with low consumption of electric power and by using a simple form of construction.

A third object of the invention is to provide a recording or reproducing apparatus with means making it possible that the replacement of the recording medium is memorized irrelevant to the turning on or off of the electric power source, and the initial operation of the apparatus is controlled in accordance with the memorized content.

A fourth object of the invention is to provide a recording or reproducing apparatus which has, despite the turning on or off of the electric power source, to preserve the information of the recording situation for the recording medium so long as that recording medium is not replaced.

To achieve such objects, according to the invention, in a preferred embodiment thereof, a recording or reproducing apparatus capable of replacing a recording medium is disclosed, including first detecting means for detecting the loading or ejection of the recording medium, second detecting means for intermittently detecting a state of the first detecting means, memory means for storing a detection result of the second detecting means, initializing means for initializing the recording medium, and control means responsive to start of a supply of electric power to the apparatus for controlling an operation of the initializing means on the basis of a stored content of the memory means.

In another preferred embodiment of the invention, a recording or reproducing apparatus is disclosed, including detecting means for intermittently detecting in a predetermined periodicity the fact that the loading or ejection of a recording medium has been performed, memory means for storing a detection result of the detecting means, and control means responsive to turning on or off of an electric power source of the apparatus for controlling an operation mode of the apparatus on the basis of a stored content of the memory means.

A fifth object of the invention is to provide an apparatus which, regardless of whether the electric power source is turned on or off, performs the initializing operation only when the recording medium has been replaced, thereby giving advantages that the consumption of electric power is lowered while still preserving the capability of snap shootings, and that the necessity of using a complicated mechanical form of detection is obviated.

A sixth object of the invention is to provide a recording apparatus which does not reset the recording control information even though the electric power source is turned on or off, and enables the recording head to be always brought into, and held in, a position from which the next recording starts, so long as the recording medium is not replaced, thus having improved the manageability and the capability of taking snap shots.

To achieve such objects, according to the invention, in a preferred embodiment thereof, a recording apparatus is disclosed, including memory means for storing management information such as recording situations for a plurality of recording tracks on a loaded disk-shaped recording medium, head moving means for moving a recording head to the plurality of recording tracks on the basis of the management information, detecting means for detecting in a predetermined periodicity the fact that the recording medium has been replaced, and control means for controlling the head moving means in accordance with a detection result of the detecting means so that, until the recording medium is replaced, a position of the head is retained despite the turning on or off of an electric power source.

Other objects of the invention and its features will become apparent from the following description of embodiments thereof in the written specification and the accompanying drawings.

DETAILED DESCRIPTION OF THE PREFERRED EMBODIMENTS

The recording or reproducing apparatus in the invention is next described in detail in connection with embodiments thereof by reference to the drawings.

Figure 1:
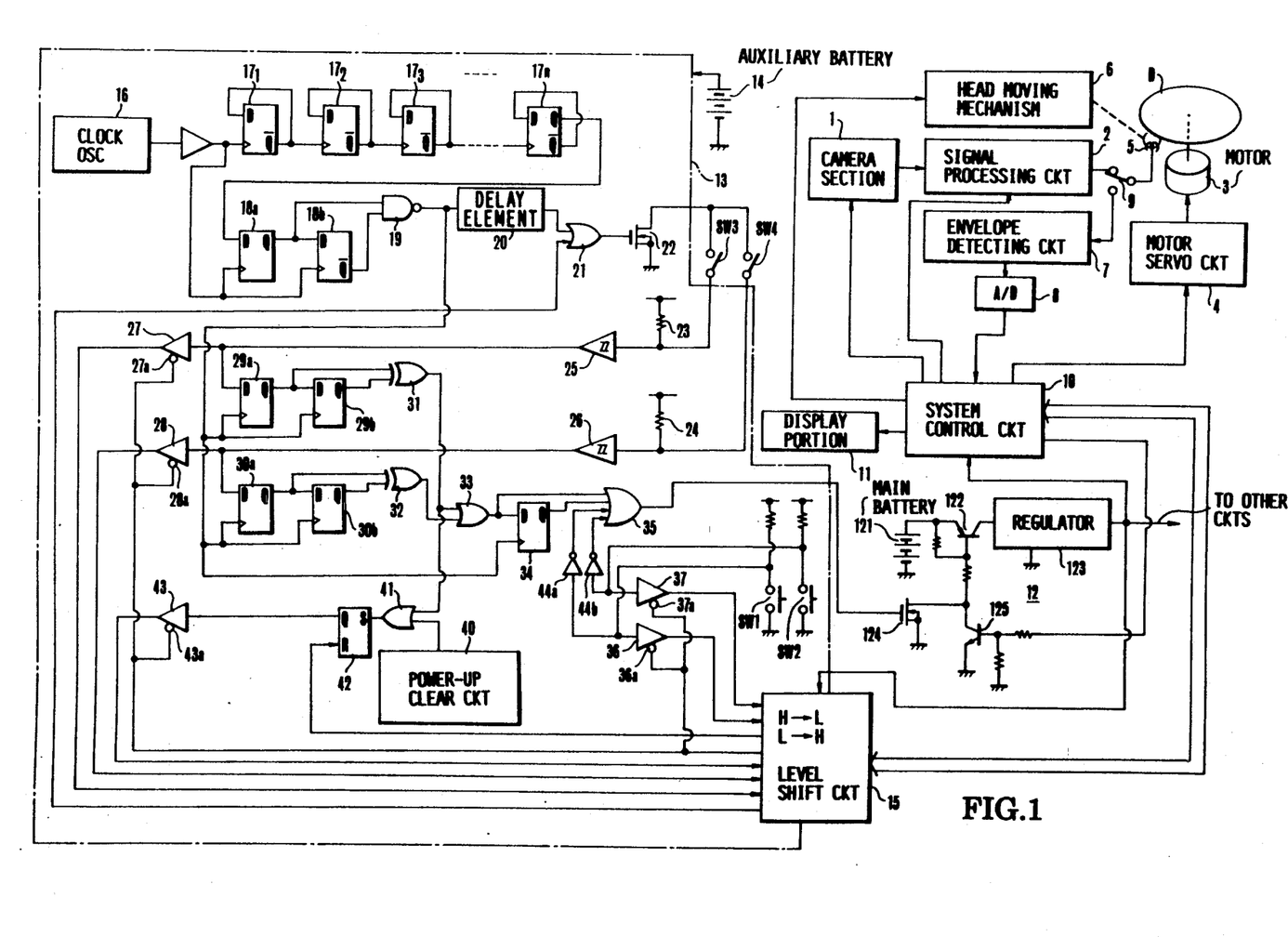
FIG. 1 is a block diagram illustrating the construction of a recording or reproducing apparatus in the invention.

FIG. 1 in block diagram shows the recording or reproducing apparatus of the invention as applied to the electronic camera.

In the same figure, a camera section 1 comprising an objective lens constituting an optical system together with other optical members, a CCD or like image pickup element, a diaphragm, a shutter, etc., converts the shot picture information into electrical signals. The electrical signal output from the camera section 1 is converted into video signals, which are then modulated in frequency to the form suited to be recorded on a magnetic disk D as the recording medium, by a recording signal processing circuit 2. An electric motor 3 rotates the magnetic disk D at a predetermined speed. The rotation of the motor 3 is controlled by a motor servo circuit 4. A recording and reproducing head 5 records the output signal of the recording signal processing circuit 2 on the magnetic disk D, or reproduces the recorded information signal from the magnetic disk D. A head moving mechanism 6 moves the head 5 in radial directions of the magnetic disk D by driving a head moving motor when the position of the head 5 is controlled so as to select a track. The reproduced RF signal from the magnetic disk D by the magnetic head 5 is subjected to envelope detection by an envelope detecting circuit 7, of which the output representing the level of the RF signal, after having been converted to digital form by an A/D converter 8, is supplied to a system control circuit 10. A switch 9 selects one of the recording signal processing circuit 2 and the envelope detecting circuit 7 to be connected to the magnetic head 5. The system control circuit 10 controls the aforesaid various circuit portions and switches in accordance with the various modes. A display portion 11 displays each operation mode, control information, etc., in accordance with an output of the system control circuit 10. A main electric power source circuit 12 is constructed from a battery 121, a voltage control transistor 122, a regulator 123, an Nch-transistor 124 for controlling the transistor 122, and a transistor 125 for holding the ON state of the transistor 124 on the basis of a control signal output from the system control circuit 10.

Reference numeral 13 denotes a disk loading or ejection detecting circuit for detecting the fact that the recording medium, that is, the magnetic disk D has been loaded or ejected, constituting that part of the apparatus which is essential to the invention. The detailed construction of its interior will be described later.

An auxiliary battery 14 supplies electric power to the disk loading or ejection detecting circuit 13 and other necessary portions. The domain to which the electric power can be supplied by the auxiliary battery 14 is indicated by a one-dot chain line block.

A loading completion detecting switch SW3 is arranged to turn on when the disk is brought to a predetermined recording and reproducing position. This occurs as follows: the disk is inserted into a disk holder for disk loading, the disk holder is then closed relative to the apparatus and the disk holder is then loaded or moved to bring the disk to a predetermined recording or reproducing position. A mode selection switch SW4 of the electronic camera system in the present embodiment is then operated. When turned on, the switch SW4 allows electric power to the system to thereby render it to be supplied from a power source to the recordable state. By this, as the display portion 11 of liquid crystal or the like is turned on, it is possible to let the user recognize the release of the locked state, etc.. When the switch SW3 remains off, the system is not operated even if the switch SW4 is turned on.

Switches SW1 and SW2 are closed in sequence when a release button of the 2-stroke type (not shown) is pushed to the first and second strokes respectively. By the closure of these switches, the supply of electric power to the system is started. The level difference of the working voltages of the disk loading or ejection detecting circuit 13 and the system control circuit 10 is compensated for by a level shift circuit 15 so that it is made possible to give and receive, and exchange data accurately.

To carry out recording by this electronic camera, therefore, the disk D is first loaded by a means (not shown) into the apparatus, thereby turning on the electric power source. An initializing operation then follows, where the head moving mechanism 6 is controlled by the system control circuit 10 in such a manner that the head 5 moves across all the tracks successively, while the output of the head 5 is simultaneously connected to the RF envelope detecting circuit 7 to examine the presence or absence of any recorded information about each track depending on the high or low level of envelope of the reproduced RF signal. Thus, the recording head 5 is moved to, and located at, the unrecorded area.

Subsequently, with the electric power source being supplied to each circuit, when the recording mode is set, the switch 9 is brought into connection with the recording signal processing circuit 2. Then, when the release button (not shown) is operated, the switches SW1 and SW2 turn on. From this time on, the picture taken in the camera section 1 is converted into an electrical signal. After having been subjected to the predetermined treatments, the electrical signal is supplied to the recording head 5 and recorded on the disk D being rotated by the motor 3.

Figure 3:
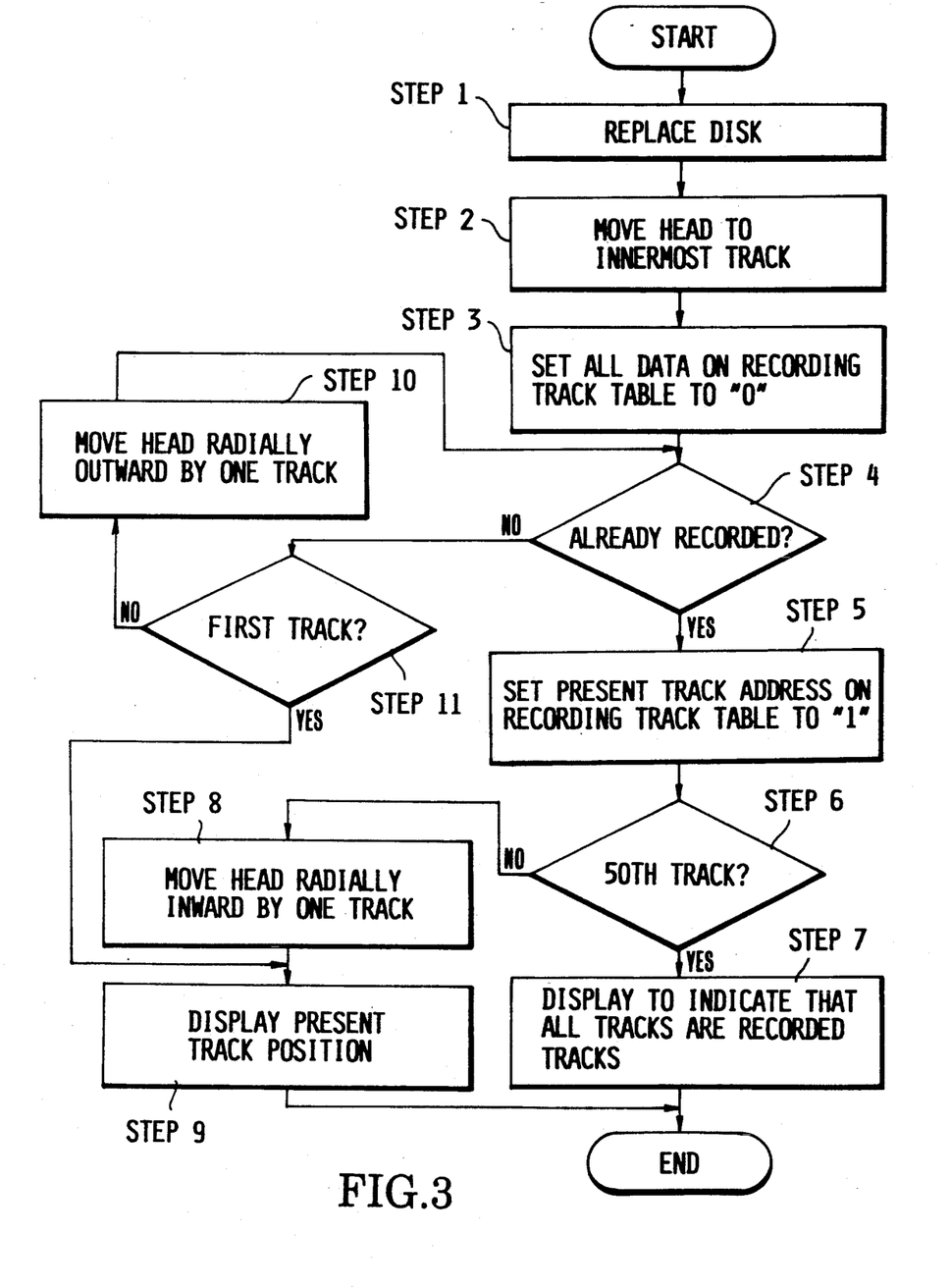
FIG. 3 is a flowchart for explaining the initializing operation.

As to the initialization of the disk D, an algorithm for its operation is shown in the flowchart of FIG. 3. And, the disk D usable in the present invention is assumed to be able to form fifty concentric tracks from the outer periphery towards the core.

In FIG. 3, when the disk D has been replaced (step 1), the head 5 is moved to the innermost track of the disk D (step 2), and the memory in the system control circuit 10 is cleared of a track table formed thereon to store information representing the presence or absence of record about each track, so that all the data on the track table are set to "0" representing an unrecorded track (step 3). Then the envelope level of the RF signal reproduced from the track on which the head 5 lies is compared with a predetermined value to judge whether or not the track has already been subjected to recording (step 4). If the track has not yet been subjected to recording, the program advances to a step 11 and judges whether or not the present track is the first track. If not so, the program advances to a step 10 wherein the head 5 is moved radially outward by one track and then returns to the step 4. In such a way, the head is moved from track to track, while the judgment of the recorded track is repeated, until the first track or any recorded track is reached. In a case where the first track is arrived at in the step 11, as it implies that all the tracks are unrecorded, the program advances to a step 9 where the present track position is displayed, thus terminating the initialization.

In another case where the arrival track is judged in the step 4 to have been recorded, the program advances to a step 5 where "1" representing a recorded track is stored in the address on the track table corresponding to the present track. In the next step 6, whether or not the present track is the 50th track is judged. If not the 50th track, the program advances to a step 8, where the head 5 is moved radially inward by one track and then to the step 9 to display the present head position, thus terminating the initialization.

If the arrival track is determined in the step 6 to be the 50th track, as it implies that all the tracks are recorded tracks, the program advances to a step 7 to make a display indicating that no track is available for recording, and the initialization ends.

Hence, at a time when the initialization is completed, the head 5 takes its place in registry with a first fresh track to be recorded, except for the case where all the tracks have been recorded.

Next, the construction and operation of the disk loading or ejection detecting circuit 13 which is most characteristic of the invention is described.

In FIG. 1, a reference clock oscillator 16 produces a train of clock pulses with a predetermined frequency. D-flip-flops $17_1$, $17_2$, ..., $17n$ the number of which is "n" are connected in series to constitute a frequency divider for dividing the clock frequency of the clock oscillator 16 to a predetermined frequency, for example, several Hz.

A D-flip-flop 18a latches the output of the last D-flip-flop 17n of the frequency divider at the reference clock output from the reference clock oscillator 16 and, until the next clock is applied, latches the input value. Responsive to the output Q of the D-flip-flop 18a, another D-flip-flop 18b produces an output $\bar{Q}$ in delay of one period of the reference clock. On receipt of the output Q of the D-flip-flop 18a and the output $\bar{Q}$ of the D-flip-flop 18b, a NAND gate 19 detects when the D-flip-flop 17n rises up. The output signal of the NAND gate 19 is delayed by a predetermined time in passing through a delay element 20 and applied through an OR gate 21 to an Nch-transistor 22, turning on this. The output of the transistor 22 is connected to one end of each of the loading completion detecting switch SW3 and the mode selection switch SW4, the other ends of which are connected through respective pull-up resistors 23 and 24 to the electric power source at the positive terminal of the auxiliary battery 14, so that they are pulled up to H level. To prevent chattering or the like from occurring at the switching time, the junctions of the switches SW3 and SW4 with the resistors 23 and 24 are connected respectively to buffer amplifiers 25 and 26 whose input response output characteristics have a hysteresis. The outputs of the buffer amplifiers 25 and 26 are applied through respective output ports in the form of buffers 27 and 28 to the level shift circuit 15 and, after converted to the predetermined level, therefrom supplied to the system control circuit 10. In turn, the operation of the buffer 27 or 28 as the output port is controlled by a control signal output from the system control circuit 10 in such a manner that when the potential at its control terminal 27 or 28 is L level, the inputted signal is allowed to pass as it is, while when H level, its output is shut off and rendered to the high impedance state.

Meanwhile, the output of the amplifier 25 is supplied to a series-connected circuit of D-flip-flops 29a and 29b and latches it in timing of the output of the NAND gate 19. The outputs Q of the D-flip-flops 29a and 29b are supplied to an EX-OR gate 31. The output of the amplifier 26 also is supplied to a series-connected circuit of D-flip-flops 30a and 30b and latches it in timing of the output of the NAND gate 19. The outputs Q of the D-flip-flops 30a and 30b are supplied to an EX-OR gate 32. The outputs of the EX-OR gates 31 and 32 are supplied to an OR gate 33. The output of the OR gate 33 is either directly or after having been delayed a predetermined time in passing through a D-flip-flop 34, supplied to respective inputs of an OR gate 35. The D-flip-flop 34 latches the output of the OR gate 33 in timing of the output of the NAND gate 19. Another inputs of the OR gate 35 are connected through inverters 44a and 44b respectively to the positive terminal of the electric power source at respective pull-up resistors for the switch SW1 which turns on by the first stroke of the release button (not shown) and the switch SW2 which turns on by the second stroke. Therefore, when any of these switches turns off, a signal of L level, or when on, of H level, is supplied to the OR gate 35.

Meanwhile, as the switches SW1 and SW2 turn on or off, these control signals are supplied to the system control circuit 10 through respective buffers 36 and 37 for output ports which, likewise the buffers 27 and 28, are controlled by commands of the system control circuit 10 and through the level shift circuit 15. Therefore, the system control circuit 10 can recognize the states of the switches SW1 and SW2 by controlling the buffers 36 and 37 for the output ports.

The output of the OR gate 35 is supplied to the Nch-transistor 124 for control of the main electric power source 12.

The output signal of the EX-OR gate 31 is supplied also to one of the two inputs of an OR gate 41, the other input of which is connected to the output of a power-up clear circuit 40. The output of the OR gate 41 is connected to the "set" terminal of an RS flip-flop 42 whose "reset" terminal is connected through the level shift circuit 15 to the system control circuit 10. The output "Q" terminal of the RS flip-flop 42 is supplied to the level shift circuit 15 through a buffer 43 for output port which is controlled at the same time with the buffers 27, 28, 36 and 37, and therefrom to the system control circuit 10.

In the following, the operation of the disk loading or ejection detecting circuit 13 in response to an ON or OFF state of the loading completion detecting switch SW is described by reference to the timing chart of FIG. 2.

Figure 2:
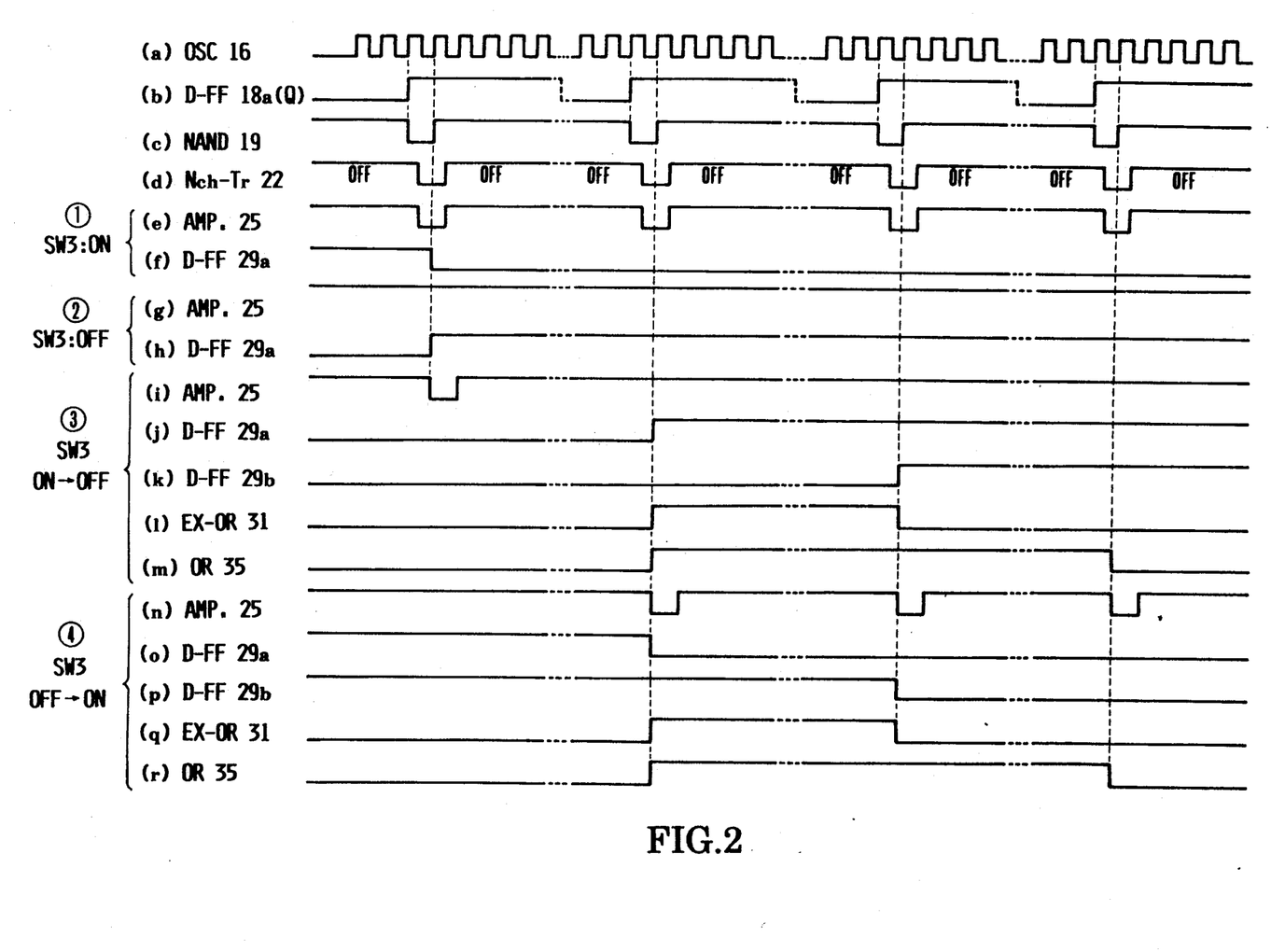
FIG. 2 is a pulse timing chart for explaining the manner in which the a of the invention operates.

(1) A case where, as the disk D has correctly been loaded in the predetermined position for recording or reproducing, the switch SW3 is held in the ON state:

Receiving the reference clock (part (a) of FIG. 2) of the reference clock oscillator 16, the frequency divider 17 produces pulses at the predetermined frequency of, for example, several Hz at the output Q of the D-flip-flop 17n. This pulse signal is latched in timing of the reference clock by the D-flip-flop 18a (part (b) of FIG. 2), and subsequently latched in timing of the reference clock by the D-flip-flop 18b, so that the rising edge of the output of the D-flip-flop 18a is detected by the NAND gate 19 (part (c) of FIG. 2). The output of the NAND gate 19 is delayed by the predetermined time by the delay element 20, so that it turns on and off the transistor 22. Hence, the transistor 22 produces a pulse signal of inverted polarity (part (d) of FIG. 2).

Since the switch SW3 remains turned on, the output of the transistor 22, after having been deprived of the chattering or the like by the amplifier 25 (part (e) of FIG. 2), is applied to the D-flip-flop 29a and to the buffer 27 as the output port. Because the D-flip-flop 29a uses the output of the NAND gate 19 as a clock in latching the output of the amplifier 25, its output is changed to, and maintained at, the low level (part (f) of FIG. 2). The D-flip-flop 29b uses the output of the NAND gate 19 as a clock in latching the Q output of the D-flip-flop 29a. Accordingly, the inputs to the EX-OR gate 31 each are at a low level, and its output is also at a low level.

The circuit that follows the switch SW4 and is comprised of the amplifier 26, the D-flip-flops 30a and 30b and the EX-OR gate 32 also operates in exactly the same manner. If the switch SW4 remains turned on, the output of the EX-OR gate 32 also is at a low level.

The output of the OR gate 33, therefore, changes to the low level. Responsive to this, the D-flip-flop 34 also changes its output to the low level. Also, since the pull-up side of the switches SW1 and SW2 is the electric power source line of high level, the outputs of the inverters 44a and 44b are at a low level. Thus, all the inputs to the OR gate 35 are at a low level. Therefore, its output is at a low level.

(2) A case where, as the disk D is not yet loaded, the disk loading detecting switch SW3 remains off:

Because the switch SW3 is off, the output of the amplifier 25 is at a high level. Therefore, the output of the D-flip-flop 29a is maintained at a low level. Thus, the same condition as that in the foregoing case (1) is established. Hence, the output of the EX-OR gate 31 is at a low level. Also, concerning even the switch SW4, a similar result is effected. If the switch SW4 is in the OFF state, the output of the EXOR gate 32 is at a low level. Therefore, when the main electric power source is off, the output of the OR gate 35 is at a low level.

From the above-described cases (1) and (2), it is to be understood that if the switches SW3 and SW4 are left stable in the ON or OFF state, any combination of the other events leads to the result that the EX-OR gates 31 and 32 produce the outputs of low level, so that the level of the output of the OR gate 35 becomes low. By this, the transistor 24 for control of the main electric power source 12 is changed to and kept in the OFF state.

(3) A case where the switch SW3 is operated as ON→OFF, as the disk has been replaced:

So long as the switch SW3 is kept in the ON state, the output pulses from the transistor 22 are supplied through the switch SW3 to the amplifier 25, and therefrom to the D-flip-flop 29a. Suppose here the switch SW3 gets turned from the ON state to the OFF state, then the output of the transistor 22 is no longer supplied to the amplifier 25. After the switch SW3 turns off, therefore, the amplifier 25 produces an output of high level (part (i) of FIG. 2).

If, as the D-flip-flop 29a holds the inputted pulse for an equal time to one period of the output pulse of the NAND gate 19, the input of the D-flip-flop 29a changes before the next output pulse of the NAND gate 19 will enter, the output of the D-flip-flop 29a also changes in response to change of the input. At a time during the next one period to that when the switch SW3 has turned off, therefore, the output of the D-flip-flop 29a changes (from low to high level) as shown on part (j) of FIG. 2. With the output of the D-flip-flop 29a being applied to the D-flip-flop 29b, when the NAND gate 19 produces another or third pulse, the output of the D-flip-flop 29b changes to the high level. It is then maintained at a high level for the next period (part (k) of FIG. 2). The output pulse of the EX-OR gate 31, therefore, takes a high level for only one period by which the output pulses of both D-flip-flops 29a and 29b have shifted from each other (part (l) of FIG. 2). The output pulse of the EX-OR gate 31 is applied through the OR gate 33 to the D-flip-flop 34, by which it is maintained at a high level for one more period of the output pulse of the NAND gate 19 (part (m) of FIG. 2). Hence, the output of the OR gate 35 takes a high level for the two consecutive periods of the NAND gate 19.

Responsive to a change of the output of the OR gate 35 to the high level, the Nch-transistor 124 turns on for an equal time to the period of output of high level of the OR gate 35, i.e., the two periods of the NAND gate 19.

At the same time that the transistor 124 turns on, the transistor 122 turns on, thus initiating a supply of electric power from the main battery 121 through the transistor 122 and the regulator 123 to the system control circuit 10 and all the other circuit portions. And, the system control circuit 10 commands the transistor 125 to turn on, so that the ON state of the transistor 122 retains itself. Subsequently to this, an operation of detecting a vacant track of the disk D (the initializing operation shown in FIG. 3) is carried out.

(4) A case where the switch SW3 is operated as OFF→ON, as the disk has been replaced:

Under the condition that the switch SW3 is in the OFF state, the output of the transistor 22 is not supplied to the amplifier 25. Therefore, the input of the amplifier 25 is pulled up to a high level through the pull-up resistor 23 and its output is also maintained at a high level. Therefore, the outputs Q of the D-flip-flops 29a and 29b each are at a high level, causing the EX-OR gate 31 to produce an output of low level.

Here, the disk D is loaded. When the switch SW3 moves OFF→ON, the amplifier 25 is supplied with the output pulse signal of the transistor 22, i.e., a pulse signal which changes to the low level in the period of the frequency divider 17n, and produces it at the output thereof (part (n) of FIG. 2). This signal is latched by the D-flip-flop 29a in timing of the NAND gate 19. The inputted pulse to the D-flip-flop 29a is held for one period of the output pulse of the NAND gate 19. If the input of the D-flip-flop 29a changes before the next output pulse of the NAND gate 19 is inputted, the output of the D-flip-flop 29a also changes depending on the input. Therefore, the output of the D-flip-flop 29a changes (high level→low level) at a time during the next period as shown in part (o) of FIG. 2. With the output of the D-flip-flop 29a being applied to the D-flip-flop 29b, when the next but one output pulse is output from the NAND gate 19, the output of the D-flip-flop 29b is changed to, and maintained at, the high level for the next but one period (part (p) of FIG. 2). Therefore, the output pulse of the EX-OR gate 31 takes a high level for only one period by which the output pulses of both D-flip-flops 29a and 29b have shifted from each other (part (q) of FIG. 2). Because the output pulse of the EX-OR gate 31 is applied through the OR gate 33 to the D-flip-flop 34 by which it continues being held to the high level for one more period of the output pulse of NAND gate 19 (part (r) of FIG. 2), the output of the OR gate 35 takes a high level for the two periods of the NAND gate 19.

Such a change of the output of the OR gate 35 to the high level causes the Nch-transistor 124 to turn on for the two periods. The subsequent operation is similar to that described in connection with the case (3).

Also, concerning the mode selection switch SW4, too, for controlling the ON/LOCK operation of the system, as is apparent from FIG. 1, similarly to the loading completion detecting switch SW3, upon detection of ON→OFF, or OFF→ON, the electric power can be supplied to the system. Then, the system control circuit 10 turns on the display portion 11 of the liquid crystal shutter type or the like, thus being able to inform the operator of the various items of information such as that of having released the system from the locked state.

It is to be noted that the RS-flip-flop 42 is set at the same time that the disk is replaced, because, as has been described above, the ON→OFF or OFF→ON change of the switch SW3 results in the production of the control signal of high level from the EX-OR gate 31.

This RS-flip-flop 42 is used for the purpose of assuring that despite the lack or the inability to operate due to exhaustion of the main battery 121 at the time when the main electric power source is turned on, the fact that the switch SW3 has been turned on or off as the disk was replaced during the while is memorized so that the above-described operation goes right at such an accident.

With the RS-flip-flop 42 set by the change of the output of the EX-OR gate 31 to the high level, if, as has been described above, the main battery 121 remains loaded and has the ability to supply sufficient electric power when the transistor 124 is turned to use the main electric power source, and, therefore, the system control circuit 10 is supplied with the electric power, the RS-flip-flop 42 is reset by the system control circuit 10 through the level shift circuit 15 after the electric power is supplied.

Meanwhile, in the event that the main battery 121 does not exist as was pulled out, or has been used up so that no electric power is supplied to the system control circuit 10, the reset signal is not supplied to the RS-flip-flop 42. When the output of the EX-OR gate 31 changes to the high level, therefore, keeping of the RS-flip-flop 42 in the set state through the OR gate 41 is started.

And, as the main battery 121 is later loaded, when the electric power source is turned on by the mode selection switch SW4, the switches SW1 and SW2 which are responsive to actuation of the release button, or other switches, the system control circuit 10 checks the state of the RS-flip-flop 42 through the buffer 43 for the output port. If its Q output terminal is set to the high level, as it implies that the track information of the initializing time in the preceding cycle has no fidelity, an initializing operation is carried out to detect a vacant track. After this, the RS-flip-flop 42 is reset.

It will be appreciated from the foregoing that, while the main battery is being unloaded, or the electric power source has been exhausted so as not to insure satisfactory operation, the disk may be replaced. Even in such a case, accurate track information can always be obtained since the occurrence of that replacement is memorized in order to perform the initialization when a new electric power source is loaded and turned on.

The power-up clear circuit 40 sets the RS-flip-flop 42 when a new auxiliary battery 14 is loaded after the old one was pulled out. Thus, this event, too, can be memorized. In a case where the auxiliary battery 14 has been pulled out, therefore, when the electric power source is later turned on by the switch SW4, SW1, SW2, etc., detection of a vacant track, i.e., the initializing operation is performed.

As a shot is taken, when the release button (not shown) is pushed to turn on the switches SW1 and SW2, the input gate of the OR gate 35 is supplied with the signal of high level. The transistor 124 then turns on, thus starting supply of electric power from the main power source to each portion. Hence, it also occurs at this time that the system control circuit 10 checks the state of the RS-flip-flop 42 through the buffer 43. The following operation is controlled in such a manner that, if the high level state indicating the replacement of the disk is not set, the initialization is not performed. If it is set, the initialization is carried out in such a way as described before. Thus, there is no possibility of occurrence of a delay in the timing of a shot, which would otherwise result from the performance of an unnecessary initialization.

It is to be noted in connection with FIG. 1, that the buffers 27, 28, 36, 37 and 43 as the output ports are opened or closed by the control signal supplied to the respective individual control terminals 27a, 28a, 36a, 37a and 43a from the system control circuit 10 through the level shift circuit 15 so that the states of the circuits to which these buffers are connected can be read at right time.

It is also to be noted that the OR gate 21 is used as desired to allow the system control circuit 10 to read the states of the switches SW3 and SW4 in real time fashion. For this purpose, the OR gate 21 is arranged to turn on the transistor 22, independently of the NAND gate 19.

As has been described above, according to the invention, information representing the occurrence of replacement or the like of the disk is made by the loading completion detecting switch SW3 in the form of its ON→OFF or OFF→ON operation and is used for initializing the disk when the electric power source turns on in order to insure that accurate track information is obtained.

Further, even if the main battery remains unloaded, the occurrence of replacement or the like of the disk is memorized. Therefore, only when the recovery for the next time of the electric power source is followed by carrying out a predetermined operation (the closure of the switch SW1, SW2, SW4, etc.), the initialization is permitted to take place.

In other words, the initialization is performed not every time the electric power source is turned on or off, but only when the disk has been replaced. Also, for the purpose of detecting the switches SW3 and SW4, instead of using the method of allowing electric current to flow always to the pull-up resistors 23 and 24, the sampling is performed in the periods of the output of the D-flip-flop 17n as the frequency divider. Therefore, it is made possible to renew the information at all times to accuracy, in accordance with which the apparatus is controlled, while nevertheless permitting reduction of the electric power consumption to large extent to be achieved.

Here, this advantage of the invention is shown, taking a concrete example of the consumed electric power by the use of the circuit for sampling the outputs of the switches SW3 and SW4 in detecting whether or not the recording medium has been replaced. Suppose the reference clock oscillator 16 has a frequency of, for example, 32.768 KHz, then the frequency divider $17_1$, $17_2$, ..., $17n$ produces pulses with a frequency of 8 Hz. Also, suppose the turning on of the loading completion detecting switch SW3 is detected for 30.5 $\mu$sec. out of the period of 125 msec. at 8 Hz, then the current flowing from the pull-up resistor 23 to the turned-on switch SW3, compared with the control case where the detecting time is prolonged to one period, is found to be:

$$30.5 \times 10^{-6}/125.0 \times 10^{-3} = 0.00024$$

This means that the consumed amount of electric power can be reduced to about 1/4000 times the amount which would otherwise result when the current is allowed to always flow. As the pull-up current is on order of about 300 $\mu$A, the average current is found to be about 0.075 $\mu$A. Thus, a great saving of electric power can be achieved.

Though the foregoing embodiment has been described in connection with the use of hard ware in realizing the disk replacement detecting device, the CPU constituting the system control circuit may be used so as to control it.

Figure 4:
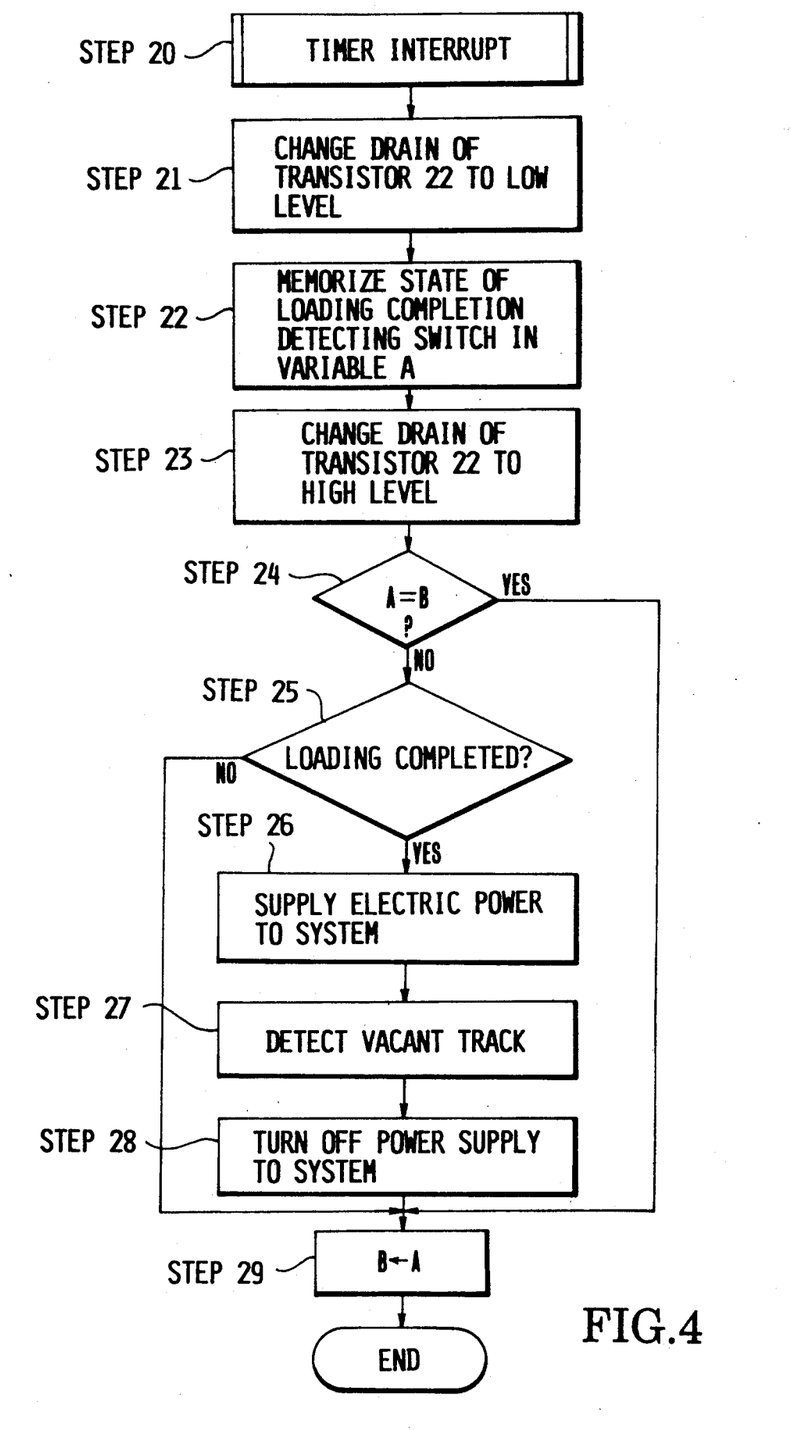
FIG. 4 is a flowchart illustrating a second embodiment of the invention.

With the use of the CPU, a control algorithm is described by reference to the flowchart of FIG. 4.

In the same figure, the control of the system control circuit 10 is timer-interrupted at a step 20 and this control flow starts. The potential at the drain electrode of the Nch-transistor 22 in FIG. 1 is changed to the low (ground) level in a step 21. In a step 22, the ON or OFF state of the loading completion detecting switch SW3 is detected through the buffer 27 for the output port, and the result is stored in a variable A. The reason to change the drain side of the transistor 22 to the low level is that since the switch SW3 is connected at one end to the drain of the transistor 22 and at the other end to the electric power source through the pull-up resistor 23, the transistor 22 side is dropped to the ground level so that the state of the switch SW3 can be judged.

Subsequently, the transistor 22 side of the switch SW3 is changed to the high level in a step 23. In a step 24, the content of the variable A is compared with the content of a variable B which is adopted to store the previous value of the variable A. If the contents of both variables A and B are equal to each other, or A=B, as it implies that the switch SW3 remains unchanged from the state detected in the preceding cycle, initialization is not performed. There occurs a jump to a step 29 where the content of the variable B is renewed to the present content of the variable A, thus terminating this routine. Then, the program returns to the original control.

In a case where the content of the variable A is found in the step 24 to be different from the content of the variable B, the program advances to a step 25 where whether or not the loading is completed is judged. If the loading is completed, the program advances to a step 26 where the electric power source is turned on. In a step 27, a vacant track is detected and the initialization is carried out. When the initialization ends, the electric power source is turned off in a step 28. The program then advances to the step 29 where the content of the variable B is renewed to the content of the present variable A, terminating the flow of this routine. On the other hand, if the disk has not yet been loaded in the step 25, the program advances to the step 29 without performing the initialization, so that the content of the variable B is renewed to the content of the present variable A, terminating the flow.

By recycling such an interruption in a predetermined periodicity, a similar operation to that of the disk loading or ejection detecting circuit can be performed. And, the use of the CPU in controlling the operation in soft ware fashion leads to a possibility of simplifying the hard ware of FIG. 1.

Figure 5:
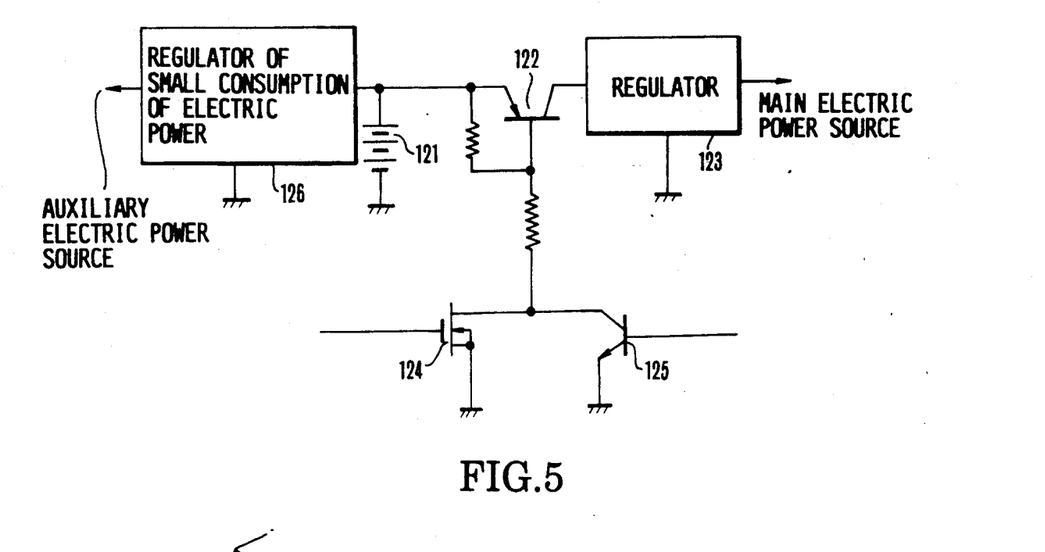
FIG. 5 is an electric-al circuit diagram of the main parts of a third embodiment of the invention.

Though, in the embodiment of FIG. 1, the auxiliary battery 14 has been provided in separation from the main battery 121, the auxiliary battery 14 is not always necessary to use. For example, as shown in FIG. 5, the main battery 121 may be made to also serve as the auxiliary electric power source with the use of another regulator 126 instead which consumes little electric power. In this case, the other constructional features are the same as those of FIG. 1, so that their explanation is omitted.

Even in this case, the RS-flip-flop 42 is set by the power-up clear circuit 40 to supply the system control circuit 10 with information about whether or not the disk has been replaced, as is similar to that described before.

Figure 6:
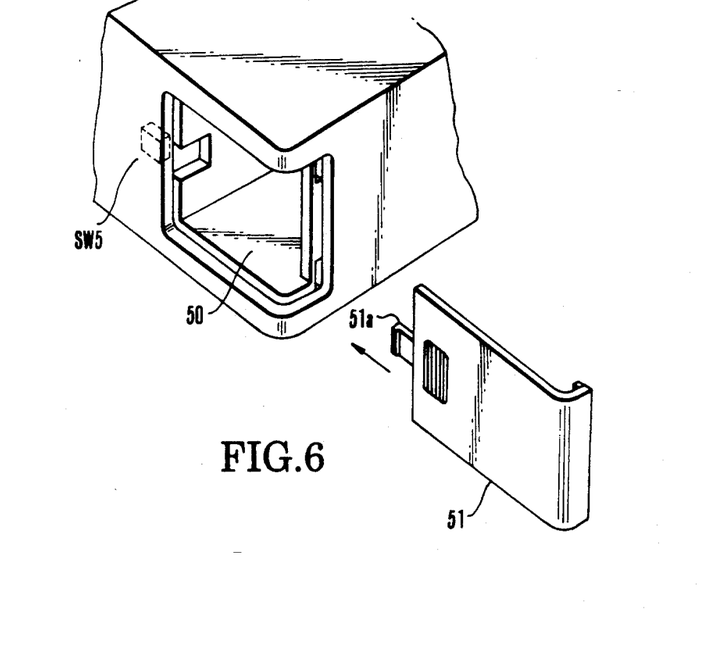
FIG. 6 is a fragmentary perspective view illustrating an example of means for detecting the loading of a battery of the invention.

Another example of modification on the supply of the electric power is that, as shown in FIG. 6, a detecting switch SW5 is arranged to detect that the battery chamber 50 for accommodating the main battery is closed by a lid 51 thereof, and the electric power source is turned on in response to closure of this detecting switch SW5.

This detecting switch SW5 has to be mounted at such a location that after the battery has been loaded into the battery chamber 50, but not before a pawl piece 51a clicks with a locking mechanism at the termination of the closing operation of the lid 51.

Therefore, when the lid 51 is closed, the electric power source of the system is immediately turned on to start an initialization for the purpose of detecting a vacant track. Incidentally, the concrete control operation is similar to that described before.

As has been described above, according to the invention, the state of the loading completion detecting switch is made to be intermittently detected, thereby giving advantages that the switch for detecting that the door for loading the disk is opened as in the prior known device can be omitted, and that the consumption of electric power can be largely reduced to a substantially negligible level.

Also, even if the battery is not loaded, or used up to the inability to operate, the fact that the disk has been replaced can be detected. In a case where the replacement of the disk has occurred, this is memorized. When the electric power source is turned on for the next time, the initialization is carried out. In a case where no replacement of the disk has occurred, no initialization is carried out because it is unnecessary to do. Therefore, not only the reduction of consumption of electric power but also a very great increase in the fidelity of management information of the disk is achieved. Further, since no unnecessary operations are performed, the capability of taking snap shots which is of cardinal importance to the electronic camera is remarkably improved.

What is claimed is:

1. A recording or reproducing apparatus capable of replacing a recording medium, comprising:
   (A) first detecting means for detecting the loading or ejection of said recording medium;
   (B) second detecting means for intermittently detecting a state of said first detecting means at a predetermined period;
   (C) memory means for memorizing a latest detection result of said second detecting means;
   (D) initializing means for initializing said recording medium; and
   (E) control means for controlling an operation of said initializing means on the basis of a memorized content of said memory means which is the latest detection result of said detecting means, when an electric power is able to be supplied to said apparatus, said control means being arranged to cause said initializing means, if an information representing that a replacement of said recording medium has occurred has been memorized in said memory means, to perform an initializing operation.

2. An apparatus according to claim 1, wherein said recording medium is a video floppy disk in the form of a flexible magnetic disk.

3. An apparatus according to claim 1, wherein said first detecting means includes a loading completion detecting switch for detecting whether or not said recording medium is loaded in a position for recording or reproducing.

4. An apparatus according to claim 3, wherein said first detecting means includes a switch to be operated in connection with the loading or ejection of said recording medium, and wherein said second detecting means samples an ON or OFF state of said detecting switch in a predetermined periodicity and causes said memory means to memorize its sampling result in such a manner that a previously memorized information is renewed.

5. An apparatus according to claim 4, wherein said initializing means judges whether recorded information is present or absent for all of a plurality of recording areas on said recording medium, and performs an operation of positioning a recording head to an unrecorded area.

6. An apparatus according to claim 5, wherein said initializing means reproduces a signal from each of said plurality of recording areas successively, and determines whether or not a record is present or absent on the basis of the level of the reproduced signal.

7. An apparatus according to claim 5, wherein said control means examines a content of said memory means when an ON or OFF operation of an electric power source is carried out, and causes said initializing means, if information representing that a replacement of said recording medium has occurred has been memorized in said memory means, to perform an initializing operation, or if said recording medium has not been replaced, not to perform the initializing operation.

8. An apparatus according to claim 7, further comprising a main electric power source battery and an auxiliary electric power source battery, and wherein said detecting means and said memory means are supplied with a current from said auxiliary electric power source battery.

9. An apparatus according to claim 8, wherein even when said main electric power source battery is turned off, it is possible to supply a current from said auxiliary electric power source battery to said second detecting means and said memory means.

10. An apparatus according to claim 7, wherein said control means, when an electrical power is supplied to said apparatus, controls said initializing operation on the basis of a memorized content of said memory means.

11. A recording or reproducing apparatus comprising:
(A) detecting means for intermittently detecting in a predetermined periodicity that a recording medium has been ejected or loaded;
(B) memory means for memorizing a detection result of said detecting means; and
(C) control means responsive to an ON or OFF state of an electric power source of said apparatus for controlling an operation mode of said apparatus on the basis of a memorized content of said memory means which is the latest detection result of said detecting means, said control means being arranged to set an initializing mode for initializing said apparatus in the case where the memorized content of said memory means indicates that a replacement of the recording medium has occurred.

12. An apparatus according to claim 11, wherein said detecting means includes a switch member having an ON or OFF position depending whether or not said recording medium is loaded in a predetermined position for recording or reproducing, and sample-and-hold means for sampling an ON or OFF state of said switch member in a predetermined periodicity.

13. An apparatus according to claim 12, wherein said control means, when said electric power source is turned on, examines a memorized content of said memory means and, if said recording medium has been replaced, performs an initializing operation.

14. An apparatus according to claim 13, wherein said control means judges whether recorded information is present or absent for all of a plurality of recording areas on said recording medium, and performs an operation of positioning a recording head to an unrecorded area.

15. An apparatus according to claim 14, wherein said recording medium is a magnetic disk having a plurality of concentric circular recording tracks formed thereon, and wherein in said initializing operation it is judged whether a record is present or absent on the basis of an envelope level of a signal reproduced from each of said recording tracks.

16. An apparatus according to claim 15, further comprising a main electric power source battery and an auxiliary electric power source battery, wherein said detecting means and said memory means are supplied with a current from said auxiliary electric power source battery, and wherein even when said main electric power source battery is turned off, it is possible to supply a current from said auxiliary electric power source battery to said detecting means and said memory means.

17. An apparatus according to claim 16, wherein turning-on of said electric power source is carried out in response to completion of the loading of said main electric power source battery.

18. A recording apparatus comprising:
(A) memory means for memorizing management information such as recording situations for a plurality of recording tracks on a loaded disk-shaped recording medium;
(B) head moving means for moving a recording head to said plurality of recording tracks on the basis of said management information;
(C) detecting means for detecting in a predetermined periodicity that said recording medium has been replaced; and
(D) control means for controlling said head moving means in accordance with the latest detection result of said detecting means so that regardless of whether an electric power source is turned on or off, a position of said recording head is held until said recording medium is replaced, said control means being arranged to cause said head to return to a predetermined standard position when the detection result of said detecting means detects a replacement of the recording medium in the state that said power source is able to supply a power to said apparatus.

19. An apparatus according to claim 18, wherein said control means, when said recording medium has been replaced, performs an initializing operation by operating said head moving means and renews said management information.

20. An apparatus according to claim 19, wherein if said recording medium is found to have been replaced in accordance with a detection result of said detecting means, said control means performs said initializing operation when said electric power source turns on.

21. An apparatus according to claim 20 further comprising a main electric power source and an auxiliary electric power source, and wherein said detecting means, even when said main electric power source is in an OFF state, can operate by using said auxiliary electric power source, and includes a memory circuit for holding the detection result until said main electric power source turns on.

22. An apparatus according to claim 20, wherein said initializing operation is to examine whether any record is present or absent on all tracks of said recording medium and moves said head to an unrecorded track.

* * * * *

UNITED STATES PATENT AND TRADEMARK OFFICE
CERTIFICATE OF CORRECTION

PATENT NO. : 5,239,426  
DATED : August 24, 1993  
INVENTOR(S) : Yuji Sakaegi

Page 1 of 2

It is certified that error appears in the above-indentified patent and that said Letters Patent is hereby corrected as shown below:

| | |
|---|---|
| Col. 1, line 24. | After "plurality" insert -- of -- |
| Col. 1, line 25. | After "after" insert -- being -- |
| Col. 1, line 35. | Change "do always" to -- always do -- |
| Col. 1, line 65. | After "with" insert -- the -- |
| Col. 2, line 10. | After "proceeding" insert -- with -- |
| Col. 2, line 37. | Change "filed on Feb. 5, 1986" to -- issued Dec. 10, 1991 -- |
| Col. 2, line 41. | Change "filed on Dec. 2, 1987" to -- issued Aug. 21, 1990 -- |
| Col. 4, line 24. | Change "a" to -- apparatus -- |
| Col. 5, line 35. | After "to" (first occurence) insert --be supplied from a power source to-- |
| Col. 5, line 36. | Delete "to be supplied from a power source" |
| Col. 5, line 39. | Change "etc.." to -- etc. -- |
| Col. 7, line 51. | Change "Another" to -- Other -- |
| Col. 7, line 58. | Change "turns" to -- turn -- |
| Col. 12, line 30. | After "to" insert -- a -- |
| Col. 12, line 57. | Change "hard ware" to -- hardware -- |
| Col. 13, line 44. | Change "hard ware" to -- hardware -- |
| Col. 13, line 51. | After "instead" insert -- , -- |

UNITED STATES PATENT AND TRADEMARK OFFICE
CERTIFICATE OF CORRECTION

PATENT NO. : 5,239,426
DATED : August 24, 1993
INVENTOR(S) : Yuji Sakaegi

It is certified that error appears in the above-indentified patent and that said Letters Patent is hereby corrected as shown below:

Col. 15, line 56. After "depending" insert -- on --.

Signed and Sealed this

Twenty-second Day of March, 1994

Attest:

BRUCE LEHMAN

*Attesting Officer*     Commissioner of Patents and Trademarks